(12) United States Patent
Dahlberg et al.

(10) Patent No.: US 11,244,168 B2
(45) Date of Patent: Feb. 8, 2022

(54) METHOD OF HIGHLIGHTING AN OBJECT OF INTEREST IN AN IMAGE OR VIDEO

(71) Applicant: Axis AB, Lund (SE)

(72) Inventors: Simon Dahlberg, Lund (SE); Anders Kruger, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/899,002

(22) Filed: Jun. 11, 2020

(65) Prior Publication Data

US 2020/0394411 A1    Dec. 17, 2020

(30) Foreign Application Priority Data

Jun. 14, 2019  (EP) ..................... 19180289

(51) Int. Cl.
*G06K 9/00* (2006.01)
*G06K 9/32* (2006.01)

(52) U.S. Cl.
CPC ..... *G06K 9/00718* (2013.01); *G06K 9/00288* (2013.01); *G06K 9/00362* (2013.01); *G06K 9/325* (2013.01)

(58) Field of Classification Search
None
See application file for complete search history.

(56) References Cited

U.S. PATENT DOCUMENTS

| | | | |
|---|---|---|---|
| 7,827,488 B2 | 11/2010 | Sitrick | |
| 8,934,044 B2 | 1/2015 | Dowd et al. | |
| 9,940,525 B2 * | 4/2018 | Wolf | H04N 7/183 |
| 2009/0317050 A1 | 12/2009 | Son et al. | |
| 2014/0023248 A1 * | 1/2014 | Yoo | G06K 9/00288 382/118 |
| 2014/0140575 A1 * | 5/2014 | Wolf | G06K 9/00771 382/103 |
| 2014/0347475 A1 * | 11/2014 | Divakaran | G06K 9/00771 348/135 |
| 2019/0261045 A1 | 8/2019 | Altuev | |

FOREIGN PATENT DOCUMENTS

| | | |
|---|---|---|
| RU | 2681364 C1 | 3/2019 |
| WO | 2012/001947 A1 | 1/2012 |
| WO | WO-2012001947 A1 * | 1/2012 ......... H04N 5/23219 |

OTHER PUBLICATIONS

Extended European Search Report dated Nov. 7, 2019 for the European Patent Application No. 19180289.1.

* cited by examiner

*Primary Examiner* — Delomia L Gilliard
(74) *Attorney, Agent, or Firm* — Volpe Koenig (57) ABSTRACT

A method of highlighting an object of interest comprises providing a digital image, determining a region of interest in the digital image covering an object of interest in the digital image having a person identifier, masking all image data in the digital image in a surrounding area to the region of interest, within the detected region of interest, determining a region of exclusion covering an object of exclusion in the digital image having another person identifier, and forming an output image comprising image data from the digital image of the region of interest, wherein the region of exclusion thereof is masked, and comprising the masked image data of the surrounding area. A device for performing the method is also disclosed. The method may be performed on an image sequence, for example in the form of a surveillance video.

12 Claims, 4 Drawing Sheets

METHOD OF HIGHLIGHTING AN OBJECT OF INTEREST IN AN IMAGE OR VIDEO

TECHNICAL FIELD

The present invention relates to the field of video processing, and in particular to how to process video in order to highlight an object of interest of an image while masking other objects.

BACKGROUND

Camera surveillance in public places has a strong securing effect in crime prevention and provides a sense of security to citizens. However, it is desirable to balance surveillance with a right to integrity for every person. Legislation can be used for this purpose. An example of such legislation is the GDPR (General Data Protection Regulation) that is valid for the EU. According to the GDPR, a person has the right to receive all data, such as video data, that for example a company holds, and which contain identifiers for that person. For video, person identifiers may be a face or other body parts, but also objects that can be related to the person, such as a license plate number.

In the case of handing out a video to a person requesting it, there is however a problem. In order to not reveal the identity of other persons that are visible, and potentially identifiable, in a video sequence, these other persons need to be removed, concealed, or masked. For this purpose, video may need to be reviewed to mask every person other than the interesting one. Object recognition may speed up the process. However, in image sequences including lots of objects, such as crowds, audiences, car traffic, privacy masking to ensure masking of every object in the image can be computational very heavy. Adding the strict requirements of GDPR where it needs to be assured that every person other than the interesting one in the image is masked, verification of the privacy masking may need to be added to ensure that no objects are missed.

With the GDPR, and similar (including future) legislations, there is a rising need to be able to provide masked video sequences in a quick, reliable, and resource-efficient manner.

SUMMARY

It would be preferable to provide a method of processing one or more digital images to highlight an object of interest, such as a human, without compromising the integrity of other persons that are identifiable in the digital image(s), in a more resource-efficient, reliable, and quick manner relative known techniques within the field.

According to a first aspect, a method of highlighting an object of interest in an image, the method comprises:
   providing a digital image,
   determining a region of interest in the digital image covering an object of interest having a person identifier,
   masking all image data in the digital image in a surrounding area to the region of interest,
   within the detected region of interest, determining a region of exclusion in the digital image covering an object of exclusion having another person identifier, and
   forming an output image comprising image data from the digital image of the region of interest, wherein the region of exclusion thereof is masked, and comprising the masked image data of the surrounding area.

The digital image that is provided may be part of an image sequence forming a video (sequence).

The method takes a digital image as input and provides an output image in which an object of interest, for example a human, is highlighted. By highlighting an object of interest is in this context meant that the object of interest is viewable while other parts of the image is made non-recognizable by masking, concealing or even removal. The method provides a tool for providing masked images, that can be used for complying with legislation such as the GDPR. That is, if a person asks an organization that performs video surveillance, such as a food store having monitoring cameras, for video material that includes him or her, this method may be used to provide such image or video content for handing out without jeopardizing the integrity of other persons that are visible in the image or video.

The approach includes masking all image data in a surrounding area that is to be included in the output image, so that the determination of the region of exclusion (that includes an object of exclusion) is only required to be performed within the detected region of interest. Hence, a quick, reliable, and resource-efficient method is provided compared to known techniques where each object in an image needs to be determined, evaluated and masked/concealed/removed. Also, the resulting output images are easy to verify since the viewable image data is significantly reduced.

The surrounding area may cover the whole digital image outside the determined region of interest. By this feature, the surrounding area does not need to be configured or determined, thus making the method even more resource-efficient.

The method may be performed in a fully automated manner or semi-automatic manner by manual use of software designed for performing the method. The software may be integrated in a video management system, whereby captured images and videos can be used for providing output images with a highlighted object of interest without the need for transmitting the images or videos to an external hardware or software.

As used herein "masked" means manipulated image data or concealed image data such that it is not possible to identify the image content. Non-limiting examples of manipulation are blurring and pixelization of image data. The image data may alternatively be concealed by exchanging the image data with a color, for example by setting all pixel values to zero (corresponding to a black color when the image is displayed). An applied masking may be reversible or irreversible.

By "region" in terms of "region of interest" and "region of exclusion" is meant an area in the digital image. The region encloses image data of the digital image. The region may be defined by coordinates, for example corner coordinates for a rectangular region, of an image coordinate system.

The object of interest, for example a human, has a person identifier. By "person identifier" is meant a feature, characteristics or object from which a person identity can be uniquely identified. Non-limiting examples of person identifiers are faces (or parts thereof), fingerprints, license plates, and id tags such as name tags.

The region of interest and/or the region of exclusion may be determined by a manual selection on a computer screen showing the image. Alternatively, a more automated determination of the region of interest and/or the region of exclusion may be implemented by use of object detection or object classification algorithms. When an object is detected by such an algorithm, the person identifier of the object may be analyzed to conclude if the object is the object of interest. If yes, the region of interest can be determined such that it covers (i.e., encloses) the object of interest. If no, a region of exclusion may instead be determined such that it covers the object which thereby forms an object to be excluded. It is not necessary that the region of exclusion and the region of interest covers the entire object of exclusion and object of interest, respectively.

Non-limiting examples of algorithms that can be used for detecting or classifying objects are body part detection algorithms, e.g. by determining key points or interest points, face detection algorithms, and motion detection algorithms.

The method may further comprise receiving an identity of a human, and determining the region of interest based on the received identity of a human. The received identity may be in the form of image data corresponding to a face of a person that has requested video/image material. Alternatively, the received identity may be in the form of a vehicle registration number in which case the region of interest may cover an object of interest being a license plate having a corresponding license plate number. Hence, the region of interest should be determined based on a received identity, in a manual or in an automated implementation of the method. For example, in the case of a received identity in the form of a license plate number, the region of interest may be determined on condition that a detected object contains letter or numbers or that is not a human object.

Going more into detail of the method when applied to a plurality of images, the method may comprise:
  providing a video sequence comprising digital images,
  for each image of a selection of digital images from the video sequence, applying the method according to any embodiment that can be applied on a single digital image, and
  forming an output video sequence comprising the output images.

In an example, a video sequence is processed to create an output video sequence in which an object of interest, for example a human, is highlighted while other objects, and a surrounding image area to the region of interest, is masked. The selection of images may be made based on a predetermined selection criterium, such as every tenth image frame. The selection may include every image in the video sequence. When the selection of digital images forms a limitation in number of digital images from the video sequence, less images need to be processed to form the output video sequence which in turn require less amount of processing resources.

In an embodiment of this method, the output video sequence also includes intermediate output images, which are formed by performing the method on temporally intermediate images located between a first selected image and a second selected image in the video sequence. For the intermediate images, the method comprises determining region of interests by interpolating between a determined first region of interest in the first selected image and a determined second region of interest in the second selected image. Provided that the second region of interest is located spatially different than the first region of interest, the interpolation may be performed by assuming a linear movement of the region of interest over a period of time covered by the intermediate frames. Other more sophisticated interpolation methods may be used where, e.g., movement pattern, speed, or movement prediction, is considered. Different variants of interpolation techniques that can be used for this purpose are well-known and readily available for the skilled person.

The region of exclusion may be determined for each image when the region of interest has been determined by use of interpolation.

In one embodiment of the method according to the first aspect applied to a video sequence, the method comprises determining further regions of exclusion in the surrounding area. The further regions of exclusion are masked in the same manner as the first region of exclusion that is determined within the detected region of interest. In subsequent images of the video sequence, that are processed according to the method, the determined further regions of exclusion are maintained by that they are masked in the output image for those images as well, even if the region of interest overlaps a further region of exclusion. In other words, any intersection between a determined region of exclusion and region of interest in a processed image of the video sequence forms a region of exclusion and is consequently masked in the output image. The regions of exclusion may be maintained by that their coordinates are stored in a computer memory.

The determination of further regions of exclusion may be performed in selected images according to a predetermined schedule, such as in every ten or twenty image frames, or once every $n^{th}$ second (where n is a predetermined value). The determined further regions of exclusion are maintained until the next selected image is processed.

In one embodiment, the determination of the region of interest is performed by selecting a bounding box for the object of interest. A bounding box is typically determined for each detected moving object in a video sequence that is analyzed by a motion detector. Bounding boxes may be received as an output from a motion detection algorithm that is run on images of the video sequence. A bounding box may be defined by its corner coordinates for an image coordinate system and is a well-known component of image analysis.

According to a second aspect, a computer program product comprises a computer-readable storage medium with instructions adapted to carry out the method of any embodiment of the first aspect when executed by a device having processing capability.

According to a third aspect, use of the method according to any embodiment of the first aspect is in in a video management system (VMS).

According to a fourth aspect, a device is arranged to highlight a region of interest in an image. The device comprises a detector arranged to determine a region of interest in the digital image comprising an object of interest having a person identifier, and to, within the detected region of interest, determining a region of exclusion covering an object of exclusion in the digital image having another person identifier. The device further comprises a processor arranged to mask all image data in the digital image in a surrounding area to the region of interest, and to form an output image comprising image data from the digital image of the region of interest, wherein the region of exclusion thereof is masked, and comprising the masked image data of the surrounding area.

The device of the fourth aspect may generally be embodied in the same ways as the method of the first aspect with accompanying advantages. The device may be arranged as a part of a video card in a VMS.

A further scope of applicability will become apparent from the detailed description given below. However, it should be understood that the detailed description and specific examples, while indicating embodiments, are given by way of illustration only, since various changes and modifications within the scope of the teachings will become apparent to those skilled in the art from this detailed description.

Hence, it is to be understood that the teachings are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The teachings will now be described in more detail by way of example and with reference to the accompanying schematic drawings, in which.

DETAILED DESCRIPTION OF EMBODIMENTS

Figure 2A:
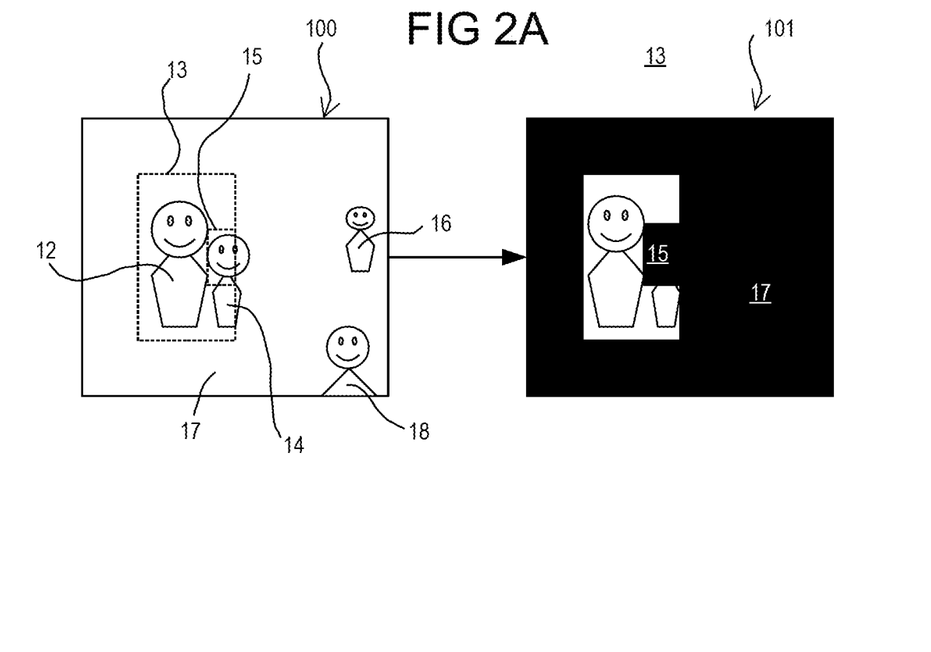
FIGS. 2A and 2B illustrate digital images and output images formed by methods according to embodiments.

Starting in FIG. 2A, an image 100 is captured by a camera monitoring a scene, e.g., for surveillance purposes. The images may be captured as a video sequence. The images or video can be stored in a conventional memory for data storage, for purposes of later review and/or analysis. For surveillance purpose, it is often the case that video recordings are stored on a server for a predetermined period of time, e.g., 2 months, and then permanently removed from the storage.

As discussed, some legislation, such as the GPRD, gives a person the right to receive video/image material that have been recorded and in which the person is identifiable. For this purpose, images need to be edited to show the concerned person, however without compromising the integrity of other persons.

The image 100 of FIG. 2A provides an example of such an image. In this image 100, several persons 12, 14, 16, 18 are visible and assumable they can be identified. In the provided example, it is the person 12, hereinafter called the person of interest 12, that is to be highlighted and the other persons' 14, 16, 18 identities should be hidden by masking at least parts of the persons 14, 16, 18 that make them identifiable. Such parts, belonging to a person or an object, are herein referred to as person identifiers. A person identifier can be a feature of a human body, such as a face, or a feature of an object, such as a license plate number or a name tag.

Figure 1:
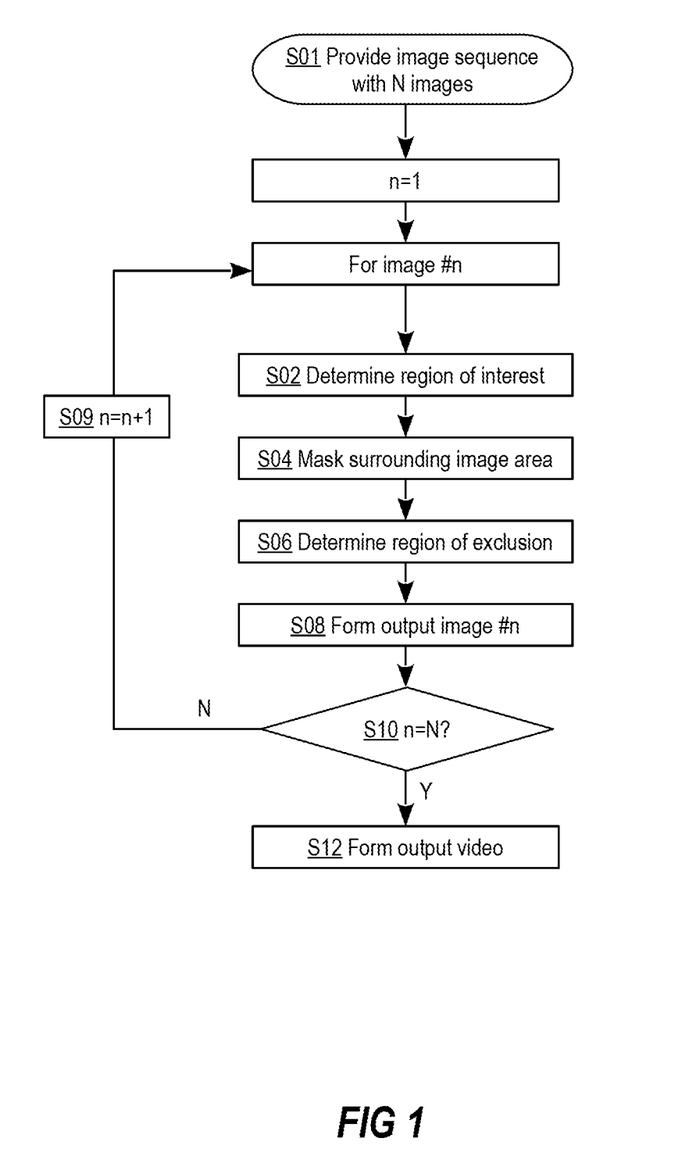
FIG. 1 is a flow chart for a method according to an embodiment.

In order to highlight the person of interest 12 in the image 100, a method comprising the steps of S02 to S08 illustrated in FIG. 1 is applied. In step S02, a region of interest 13 in the image 100 is determined. This can be done semi-automatically by that a user selects or marks (via a computer) the region of interest 13 which comprises the object of interest 12. The region of interest 13 in the image 100 covers an image area with image data corresponding to at least a part of the object of interest 12. The whole body or a part of the body, comprising a person identifier of the object of interest 12, may be selected/marked.

A more automatic approach to the determination can instead be applied. For example, an object detection algorithm may be performed on the image 100 to detect any present objects. This would, ideally, result in a detection of all imaged persons 12, 14, 16, 18 and the detection may be visualized (on a display) for a user by overlaying the image 100 with boxes surrounding each person. From the result, a boxed image area may be selected as the region of interest 13 by a manual input. In an even more automatic implementation, the region of interest 13 may be determined by performing a comparison between the image data of detected objects with input data of a person identifier such as image data of a face or text data of a name or a vehicle registration number. Upon a positive outcome of the comparison, the compared detected object may be set to the object of interest 12 and an area covering the object of interest 12, or at least parts thereof, be automatically defined and set as the region of interest 13. The input data may be received beforehand or be input manually. A system implementing the method may prompt a user to input such data.

Next, according to the method, a surrounding image area 17 to the region of interest 13 is masked S04. In particular, all image data in the surrounding image area 17 is masked meaning that any person identifier that is located in the surrounding image area 17 will be masked. In other words, the image data of the image 100 in the surrounding area 17 is either concealed by exchanging all pixel values of the image data, e.g., to a predetermined value such as zero, or manipulated so as to create a masking of the surrounding area 17.

Next, a region of exclusion 15 is determined S06. The region of exclusion 15 needs to be determined only within the region of interest 13, since the surrounding area 17 is masked. This is a resource efficient way to determine the region of exclusion 15, compared to scanning also the surrounding area 17 and potentially the whole image 100. The region of exclusion 15 is a region that covers (including partly covers) an object of exclusion 14 which has a person identifier that is not the same as the person identifier for the object of interest 12. It is noted that the person identifier needs not necessarily be covered by the region of exclusion 15 when the person identifier is partly located in the region of interest 13 and partly outside (in the surrounding area 17). The person identifier is part of the object of exclusion 14 seen as a whole. For example, a face of a person may form a person identifier which is only partly covered by the region of interest, as is the case of FIG. 2A. It is not necessarily the case that it would have been possible to identify the object of exclusion 14 by the face part covered by the region of interest 13, however the present method will mask the face anyway to reduce the need for extra verification and provide a reliable masking. Moreover, it is noted that the person identifier may be determined based on image data covered by the region of interest in combination with image data located outside the region of interest. For example, looking at the image 100 in FIG. 2A, the person identifier in the form of a face of the person 14 may be defined as a person identifier by analyzing image data of the digital image 100 located in the region of interest 13 and in the surrounding region 17.

Similar to the region of interest 13, the region of exclusion 15 can be determined manually, semi-automatically, or in a more automatic manner by more or less use of different algorithms. For example, the region of exclusion 15 may be determined by use of an object classification algorithm performed on image data covered by the region of interest 13. If a person identifier, such as a face or a license plate, is detected and is not of the same object class or in the same location as the person identifier of the object of interest 12, it can be assumed that another person identifier is detected and a region of exclusion 15 covering this another person can be defined.

An output image 101 is then formed S08. The output image 101 comprises image data from the region of interest 13, however the image data covered by the region of exclusion 15 therein are masked. This means that the image data of the region of exclusion 15 is not included in the output image 101, or that a manipulated version of the image data is included. In any case, the masked image data covered by the region of exclusion 15 cannot be used for identifying the person 14. Moreover, the masked image data of the surrounding area 17, in this example the rest of the digital image 100, are included in the output image 101. The spatial relationship between the region of interest 13, the region of exclusion 15, and the surrounding area 17 is kept in the output image 101. For this example, the output image 101 has the same dimension, e.g. 1920×1080 pixels, as the digital image 100.

As can be seen, in this example a masking in the form of setting pixels values to zero, corresponding to black color, is used for the region of exclusion 15 and for the surrounding region 17. It is not necessary to use the same masking method for different areas of the image, or for the same areas in different output images of a sequence.

Figure 2B:
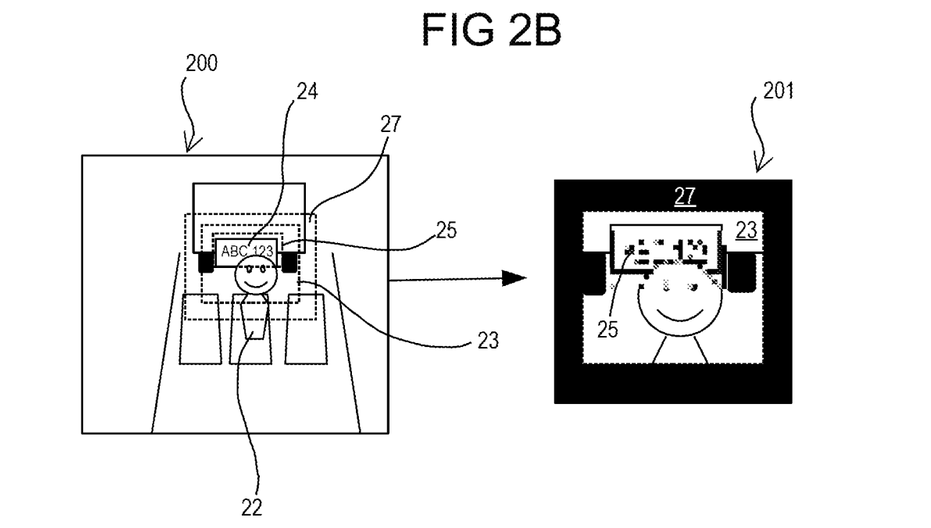

In FIG. 2B, another example of a digital (input) image 200 and corresponding output image 201 is illustrated. Here, the imaged objects include a person 22 crossing a street behind a vehicle (which drives away from the camera) with a license plate 24. The license plate 24 comprises a license plate number "ABC 123" that corresponds to a vehicle registration number and forms a person identifier for the vehicle owner.

During analysis of the image 200 by the discussed method, a region of interest 23 is first determined. As for previous examples, this can be achieved in a less or more automatic manner. All image data in a surrounding area 27 is thereafter masked by replacing the image data with a predetermined pixel value. Contrary to the example of FIG. 2A, the surrounding region 27 covers a limited image area around the region of interest 23. The expansion of the surrounding region 27 may be determined by a target output image size. For example, the surrounding region 27 may be determined on an image-to-image basis to fill out an area between the determined region of interest and the target output image size. Alternatively, the surrounding region 27 may have a predetermined expansion outside the region of interest 23. It is noted that the surrounding area 27 does not need to fully enclose the region of interest 23. Moreover, the surrounding area 27 covers an image area that is adjacent to the image area covered by the region of interest 23.

Within the region of interest 23, a region of exclusion 25 is determined. Here, a person identifier in the form of a license registration number is identifier within the region of interest 23, and the region of exclusion 25 is formed around the image area including this person identifier.

An output image 201 is formed, comprising image data from the input image 200 of the region of interest 23. However, the image data within the region of exclusion 25 is masked by being pixelated to an unidentifiable degree, meaning that the license plate number cannot be recognized in the output image 201. In this example, image data corresponding to the object of interest 22 is partly masked since it is included in the region of exclusion 25. The output image 201 also includes the masked image data of the surrounding area 27.

Different considerations can be done for masking of image data to an unidentifiable degree. Firstly, what is considered to be unidentifiable may be different in different implementations depending on, e.g., how the term identifiable is defined within the particular field of application or which legislation that an output image should fulfil. Secondly, the masking to an unidentifiable degree may be performed based on further parameters (obtained from analysis of the image 200 or from an external source) such as how large image area is or how many pixels that the image area covered by the region of exclusion 25 has.

The discussed method can be extended to be applied to an image of an image sequence. In essence, this means that the method is performed on a selection or on all images of a sequence of images that may together form a video. A purpose with processing an input video and forming an output video with a highlighted object of interest can for example be when a person requests all recorded video material of him or her from a party performing video monitoring. With reference to FIG. 1, a video sequence including N images is first provided S01. Starting with, e.g., n=1, the method of steps S02 to S08 is performed as previously discussed. It is checked in step S10 if n is equal to N. If not, n is increased S09 by 1 and the method S02-S08 is performed on the image n. The sub-method S02-S08 is iterated until n reaches N, that is until all images 1 to N have been processed. Thereafter, an output video is formed S12 that includes all formed output images, preferably in a corresponding temporal order as in the original image sequence.

The method may be varied. For example, each image in the image sequence needs not be analyzed. In one embodiment, a selection of images is processed by the steps S02-S08 to form output images that are included in the output video formed in step S12. In such an embodiment, n may be increased by more than 1 in each iteration so as to skip processing for some intermediate images in the image sequence. Alternatively, the method may include a step of selecting a plurality of images from the image sequence which in turn forms an image sub-sequence for which each image is processed. The output video that is formed by output images of a selection of images is preferably formed in a chronological order corresponding to the original video sequence.

Figure 3:
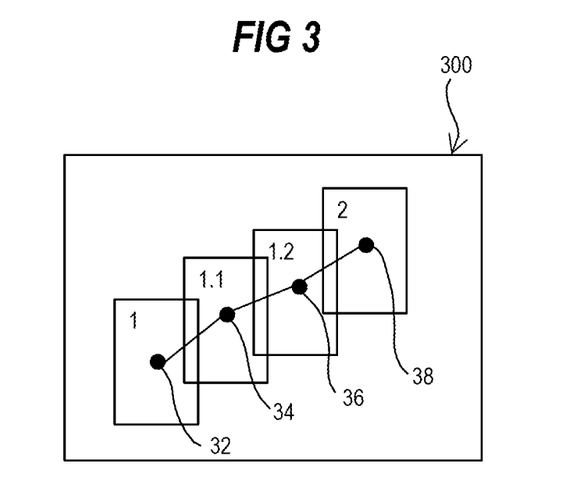
FIG. 3 illustrates interpolated regions of interest for an image sequence.

The step S02 of determining a region of interest may, in the case of processing an image of an image sequence, be done in accordance with any of the previously discussed and exemplified ways. However, an alternative way to determine the region of interest in each image is illustrated in FIG. 3. Here, the regions of interest 1, 1.1, 1.2, 2 are, for easier understanding, illustrated in a same image 300 which represents every image in an image sequence. In this example, a first region of interest 1 of a first selected image is determined, and a second region of interest 2 of a second selected image is determined. These regions of interest 1, 2 may be determined in ways that have been discussed previously. For example, by manual selection or via object identification or classification. However, regions of interest 1.1, 1.2 for intermediate images located between the first selected image and the second selected image, in the image sequence, are not determined in this way. Instead, interpolation between the first region of interest 1 and the second region of interest 2 is used. In this example, a first reference point 32 in the first region of interest 1 and a second reference point 38 in the second region of interest 2 are known. The reference points 32, 38 may represent a detected object of interest that has been detected and that defines respective region of interest 1, 2. Intermediate reference points 34, 36 are generated by interpolation between the first reference point 32 and the second reference point 38. Any known and suitable interpolation method may be used for the generation and may be selected depending on the application.

By using interpolation, the object of interest does not need to be recognized and determined in the intermediate images and thus a quicker and less resource-demanding method may be achieved. Through a sequence of images, some of the images, such as every $10^{th}$ frame, may be selected and pairwise form first and second images, for which intermediate images are processed with use of interpolation. The output images, and output video thereof, may be formed in accordance to previously disclosed embodiments, and are not illustrated in FIG. 3.

Figure 4:
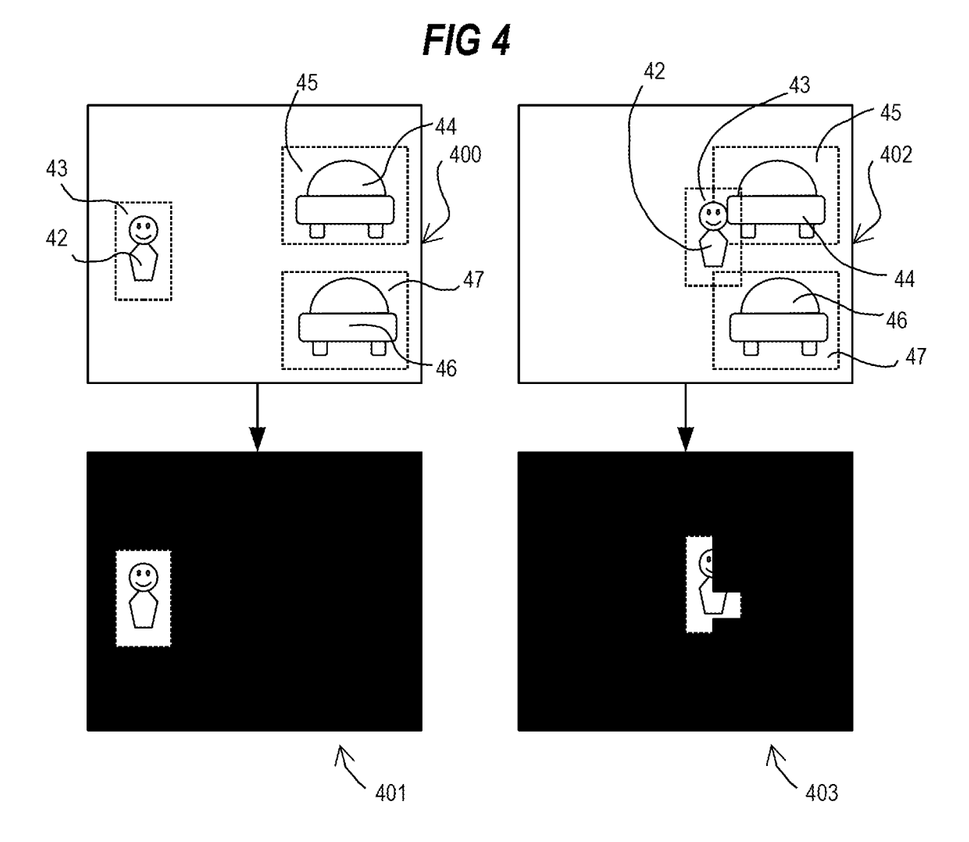
FIG. 4 illustrates digital images of a video sequence and output images formed by a method according to an embodiment.

FIG. 4 illustrates an embodiment in which permanent regions of exclusions 45, 47 for an image sequence are determined. Two images 400, 402 of the image sequence are illustrated. In the first image 400, an object of interest 42 is present and a region of interest 43 is defined. Specific for this embodiment, further regions of interest 45, 47 are determined. These are located outside the region of interest 43. The further regions of interest 45, 47 each cover objects that potentially include person identifiers. The objects are preferably identified as static objects or objects with low or no movement, such as cashiers or parked vehicles, which likely maintain within the determined further region of exclusion throughout the image sequence. In this example, a first parked car 44 defines the first further region of interest 45 and a second parked car 46 defines the second further region of interest 47.

Within the determined region of interest 43, a region of exclusion may be determined, however this is not the case in this example since there are no other objects within the region of interest. The rest of the image, i.e. a surrounding area to the region of interest 43, including the further regions of interest 45, 47 is masked. An output image 401 is formed in accordance with previously discussed embodiments.

In the second image 402, the object of interest 42, and thus the region of interest 43, has moved. The region of interest 43 now intersects with both the first further region of exclusion 45 and the second further region of exclusion 47. Between the region of interest 43 and each of the first and second further region of exclusion 45, 47, an overlapping region is formed. As a further step in the method of highlighting the object of interest 42, the overlapping regions are masked. An output image 403 is formed with image data of the region of interest 43, wherein any region of exclusion thereof is masked. This includes masking of both a determined region of exclusion (not the case in this example) and the overlapping region to the further regions of exclusion 45, 47. By this embodiment, objects of a scene may be defined/marked in an easy and efficient manner in one or few images with effect for a whole image sequence.

Further regions of exclusion may be defined at a regular interval, e.g., every $10^{th}$ recording minute of a video sequence. Coordinates of the further regions of exclusion may be stored in a digital memory.

Figure 5:
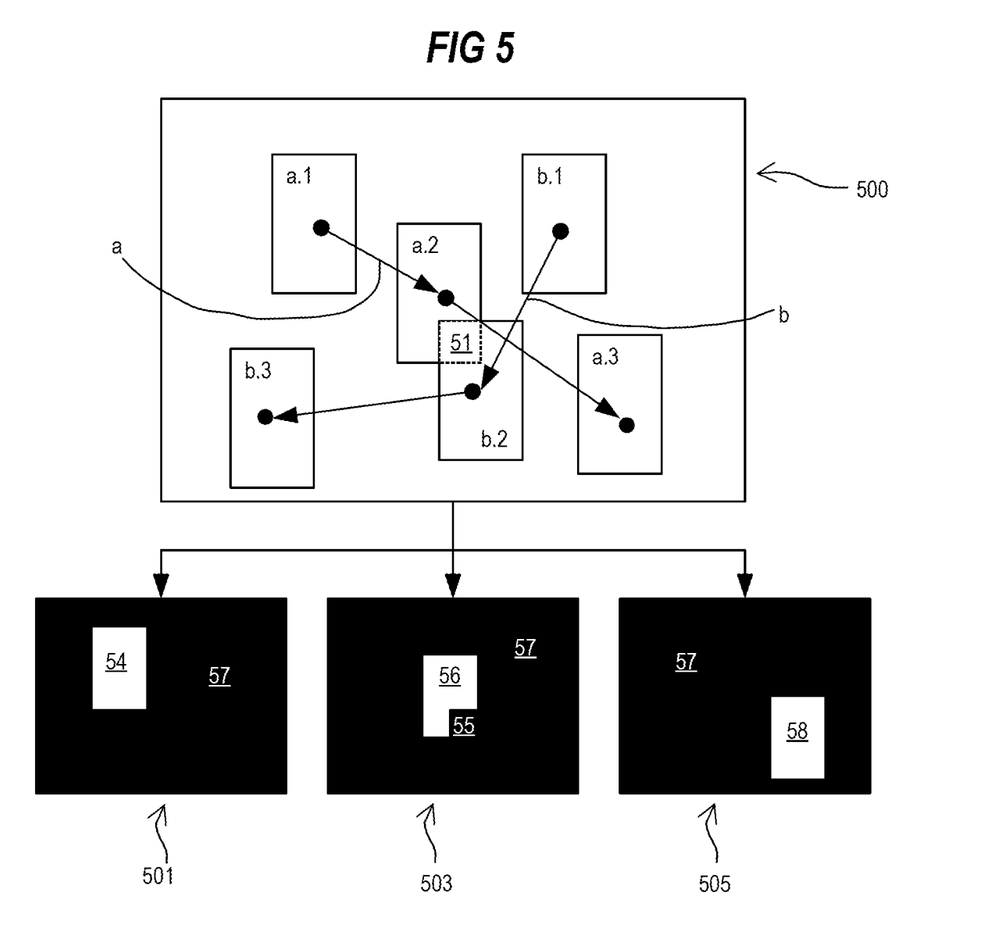
FIG. 5 illustrates regions of interest and regions of exclusion for a method according to an embodiment, that are determined based on bounding boxes, and output images formed by the method.

An alternative way to determine the region of interest will now be disclosed with reference to FIG. 5. Here, regions of interest a.1, a.2, a.3 are determined as a selection of bounding boxes and illustrated in the same image 500 which represent different images in an image sequence. Bounding boxes may be output from, and input to the present method, from a conventional object tracking algorithm based on analysis of an image sequence. A user may be presented with a number of bounding boxes as an overlay to an image in the video sequence. The user may determine the regions of interest a.1, a.2, a.3 by selecting the bounding box that surrounds the object of interest in each image, which is identified by the user through, e.g., a person identifier of the object of interest. Alternatively, the user may select a bounding box a.1 in a first image and an association with that bounding box track a is created to maintain the selection throughout the image sequence. In that case, the user needs to make only one selection per object of interest. During the rest of the video sequence, for which bounding boxes a.2, a.3 are determined and will change position throughout the video sequence, the region of interest is already selected. When a region of interest has been selected, other bounding boxes b.1, b.2, b.3, or selected parts thereof, associated with a track b may be determined to be further regions of exclusion. As previously discussed, a method of highlighting the object of interest may include, if a region of interest intersects in any image of the image sequence with a further region of exclusion, a formed overlap 51 will constitute a region of exclusion and consequently be masked in the output image.

The selection of which bounding box that is to be associated with the region of interest may be performed in an automatic manner by analyzing image data of different bounding boxes to identify a person identifier and compare it to a previously received person identifier that indicates which object of interest that is to be highlighted.

A series of output images 501, 503, 505 are formed in accordance with previous disclosure. That is, image data of regions of interest 54, 56, 58 are included, however a region of exclusion 55 is masked. A surrounding area 57 is included in every output image 501, 503, 505.

Alternative embodiments where regions of interest and/or (further) regions of exclusion are determined by use of known tracking methods are also possible. Tracking methods, such as re-identification algorithms, Kernel-based tracking or contour tracking, may be implemented. Output from these algorithms may be fed to the discussed method of highlighting an object of interest and used for determining regions therein.

The method of highlighting an object of interest may be implemented as a hardware implementation or as a software implementation. The implementation may be located in a video management system (VMS) such that an output video with a highlighted object of interest may be formed from the same device as used for viewing live and recorded video sequences. Thus, the video sequences do not need to be transferred to another hardware or software in order to process it to provide desired output video.

In a hardware implementation, a detector and a processor adapted to perform steps of the method may be provided as circuitry which is dedicated and specifically designed to provide the desired functionality. The circuitry may be in the form of one or more integrated circuits, such as one or more application specific integrated circuits or one or more field-programmable gate arrays.

In a software implementation, the circuitry may instead be in the form of a processor, such as a microprocessor, which in association with computer code instructions stored on a (non-transitory) computer-readable medium, such as a non-volatile memory, carries out (part of) any method disclosed herein. Examples of non-volatile memory include read-only memory, flash memory, ferroelectric RAM, magnetic computer storage devices, optical discs, and the like. In a software case, the detector and the processor may thus each correspond to a portion of computer code instructions stored on the computer-readable medium, that carry out the functionality of the component.

It is to be understood that it is also possible to have a combination of a hardware and a software implementation.

The person skilled in the art realizes that the present concept is by no means is limited to the preferred embodiments described above. On the contrary, many modifications and variations are possible within the scope of the appended claims.

The invention claimed is:

1. A method of highlighting an object of interest in an image, the method comprising:
   providing a digital image;
   receiving data representing one or more bounding boxes determined for objects in the digital image;
   determining, by selecting one of the one or more bounding boxes, a region of interest, inside the digital image, covering an object of interest having a person identifier, wherein the person identifier is a feature, characteristic or object from which a person identity can be uniquely identified;
   masking all image data in the digital image in a surrounding area to the region of interest;
   within the region of interest, determining a region of exclusion covering an object of exclusion in the digital image having another person identifier; and
   forming an output image comprising image data from the region of interest, wherein the region of exclusion thereof is masked, and comprising the masked image data of the surrounding area.

2. The method according to claim 1, wherein the surrounding area corresponds to the rest of the digital image.

3. The method according to claim 1, wherein the image data is masked by manipulation of image data from the digital image.

4. The method according to claim 1, wherein the object of interest is a human.

5. The method according to claim 4, further comprising receiving an identity of a human, and wherein the act of determining the region of interest is performed based on the received identity.

6. The method according to claim 1, wherein the act of determining a region of interest or determining a region of exclusion comprises executing an object detection algorithm on the digital image.

7. The method according to claim 1, wherein the person identifier comprises a face, a license plate, or an id tag.

8. A method of highlighting an object of interest in a video sequence, the method comprising:
   providing a video sequence comprising digital images,
   for each image of a selection of digital images from the video sequence, applying the method according to claim 1, and
   forming an output video sequence comprising the output images.

9. A method of highlighting an object of interest in a video sequence, the method comprising:
   providing a video sequence comprising digital images;
   for a first image selected from the video sequence,
      receiving data representing one or more bounding boxes determined for objects in the first image, and
      determining, by selecting one of the one or more bounding boxes, a first region of interest, inside the first image, covering an object of interest having a person identifier, wherein the person identifier is a feature, characteristic or object from which a person identity can be uniquely identified;
   for a second image selected from the video sequence,
      receiving data representing one or more bounding boxes determined for objects in the second image, and
      determining, by selecting one of the one or more bounding boxes, a second region of interest, inside the second image, covering the object of interest;
   for temporally intermediate images located between the first image and the second image in the video sequence,
      determining respective regions of interest by interpolation between the first region of interest in the first image and the second region of interest in the second image;
   for each digital image of the first image, the second image, and the temporally intermediate images,
      masking all image data in the digital image that are in a surrounding area to the digital image's respective region of interest,
      within the respective region of interest, determining a region of exclusion covering an object of exclusion in the digital image having another person identifier, and
      forming an output image comprising image data from the respective region of interest, wherein the region of exclusion thereof is masked, and comprising the masked image data of the surrounding area; and
   forming an output video sequence comprising the output images.

10. A non-transitory computer-readable storage medium with instructions adapted to carry out a method when executed by a device having processing capability, the method comprising:
   providing a digital image;
   receiving data representing one or more bounding boxes determined for objects in the digital image;
   determining, by selecting one of the one or more bounding boxes, a region of interest inside, the digital image, covering an object of interest having a person identifier, wherein the person identifier is a feature, characteristic or object from which a person identity can be uniquely identified;
   masking all image data in the digital image in a surrounding area to the region of interest;
   within the region of interest, determining a region of exclusion covering an object of exclusion in the digital image having another person identifier; and
   forming an output image comprising image data from the region of interest, wherein the region of exclusion thereof is masked, and comprising the masked image data of the surrounding area.

11. A device arranged to highlight a region of interest in a digital image, the device comprising:
   a detector arranged to receive data representing one or more bounding boxes determined for objects in the digital image, determine, by selecting one of the one or more bounding boxes, a region of interest, inside the digital image, covering an object of interest having a person identifier, wherein the person identifier is a feature, characteristic or object from which a person identity can be uniquely identified, and within the region of interest, determine a region of exclusion covering an object of exclusion in the digital image having another person identifier; and a processor arranged to mask all image data in the digital image in a surrounding area to the region of interest, and form an output image comprising image data from the region of interest, wherein the region of exclusion thereof is masked, and comprising the masked image data of the surrounding area.

12. The device according to claim 11, arranged in a video card of a video management system.

* * * * *